United States Patent
Shimma (10) Patent No.: US 11,962,894 B2
(45) Date of Patent: Apr. 16, 2024

(54) ELECTRONIC DEVICE AND CONTROL METHOD THEREOF

(71) Applicant: CANON KABUSHIKI KAISHA, Tokyo (JP)

(72) Inventor: Naoki Shimma, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 400 days.

(21) Appl. No.: 17/320,956

(22) Filed: May 14, 2021

(65) Prior Publication Data

US 2021/0368108 A1  Nov. 25, 2021

(30) Foreign Application Priority Data

May 19, 2020  (JP) .................................. 2020-087371

(51) Int. Cl.
| | | |
|---|---|---|
| *G06F 1/3231* | (2019.01) | |
| *H04N 23/62* | (2023.01) | |
| *H04N 23/63* | (2023.01) | |
| *H04N 23/65* | (2023.01) | |
| *G06F 3/0482* | (2013.01) | |

(52) U.S. Cl.
CPC ........... *H04N 23/651* (2023.01); *H04N 23/62* (2023.01); *H04N 23/632* (2023.01); *G06F 1/3231* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 10,877,705 B1* | 12/2020 | Watanabe | ............... G06F 3/126 |
| 2017/0013194 A1* | 1/2017 | Lee | .......................... G06F 3/017 |
| 2017/0090553 A1* | 3/2017 | Hiraike | .............. H04N 1/00506 |

FOREIGN PATENT DOCUMENTS

| | | |
|---|---|---|
| JP | 2000165705 A | 6/2000 |
| JP | 2019032373 A | 2/2019 |

\* cited by examiner

*Primary Examiner* — Paul Yen
(74) *Attorney, Agent, or Firm* — CANON U.S.A., INC. IP Division (57) ABSTRACT

An electronic device controls so as to perform display on a display that is visible through the proximity portion; regardless of whether proximity to the proximity portion is detected or not, place the electronic device in a predetermined state to reduce power consumption of the electronic device in response to elapse of a first period without an operation on the operation member; and in a case where proximity to the proximity portion is not detected, place the electronic device in the predetermined state to reduce power consumption of the electronic device in response to elapse of a second period without an operation on the operation member and without proximity to the proximity portion. The second period is shorter than the first period.

19 Claims, 8 Drawing Sheets

FIG. 8C

ELECTRONIC DEVICE AND CONTROL METHOD THEREOF

BACKGROUND

Technical Field

One disclosed aspect of the embodiments relates to an electronic device and a control method therefor, and particularly to a power-saving operation of the electronic device.

Description of the Related Art

A technique is known that controls a device using a proximity sensor for detecting the proximity of a person or an object. For example, an electronic device such as a camera may use a proximity sensor as an eye-proximity sensor that detects a state in which a user looks into the viewfinder, that is, an eye-proximity sensor that detects proximity to the viewfinder (the presence of eye in proximity). The electronic viewfinder is switched on and off (the display on the electronic viewfinder is turned on and off) in accordance with the detection state of proximity.

Japanese Unexamined Patent Publication No. 2000-165705 discloses a digital camera that includes an optical viewfinder and a proximity sensor. Upon detection of proximity, the digital camera switches off (turns off the display on) the rear display panel to save power. This digital camera has an auto power-off function that turns its power off when the digital camera is not operated for a predetermined period of time. The auto power-off function is disabled while proximity is detected so that the auto power-off function is not activated while the optical viewfinder is in use. The auto power-off function is preferably disabled also for the electronic viewfinder during a time in which the electronic viewfinder is assumed to be in use, such as when proximity is detected.

The electronic device may be hung from the user's neck with a strap or the like. In some cases, the user does not trouble with turning the power on and off, expecting the auto power-off function to activate. In such use states, the proximity sensor of the electronic device may react to the user's abdomen or folded arms, thereby disabling the auto power-off function in the same manner as when the viewfinder is in use. As a result, the power of the electronic device remains on against the intention of the user, causing the battery of the electronic device to run out faster.

Japanese Patent Application Publication No. 2019-32373 discloses an electronic device that includes a timer for a proximity sensor, in addition to a power-saving timer whose count is reset when proximity is detected. Upon detection by the proximity-sensor timer that a first period has elapsed without any operation, this electronic device disables the detection of proximity by the proximity sensor but continues the counting of the power-saving timer. This solves the problem described above.

However, with the conventional technique of Japanese Patent Application Publication No. 2019-32373, the proximity sensor may fail to react to proximity even when the power of the electronic device is on, thus failing to switch on the electronic viewfinder (failing to turn on the display on the electronic viewfinder). This does not cause significant inconvenience when the device includes a plurality of display units, such as a rear display panel and an electronic viewfinder, and a display unit other than the electronic viewfinder is activated. However, when the device is configured otherwise, the above-mentioned situation causes inconvenience.

For example, such an inconvenient event may occur with an electronic telescope (electronic monocular, electronic binoculars, etc.) including only an electronic viewfinder as the display unit. Specifically, its proximity sensor may fail to react to proximity, thus failing to switch on the electronic viewfinder. The user therefore cannot quickly check the display on the electronic viewfinder. This may result in the user missing the desired scene when the electronic telescope is used to watch sports or birds, for example. Furthermore, power saving is also important, and when the electronic telescope is used to watch sports, for example, the power of the electronic telescope has to be saved so that the electronic telescope can remain driven by the battery at least during the period corresponding to the length of a game.

SUMMARY

One aspect of the embodiments provides an electronic device that transitions to a power-saving state with desirable timing and also allows the user to quickly check the display on a display unit (such as an electronic viewfinder) that is visible through a proximity portion, until the electronic device transitions to the power-saving state.

An electronic device includes a proximity detector, an operation detector, at least one memory, and at least one processor. The proximity detector is configured to detect proximity to a proximity portion. The operation detector is configured to detect an operation on an operation member. The at least one memory and at least one processor function as a control unit configured to control so as to (1) perform display on a display that is visible through the proximity portion; (2) regardless of whether proximity to the proximity portion is detected or not, place the electronic device in a predetermined state to reduce power consumption of the electronic device in response to elapse of a first period without an operation on the operation member; and (3) in a case where proximity to the proximity portion is not detected, place the electronic device in the predetermined state to reduce power consumption of the electronic device in response to elapse of a second period without an operation on the operation member and without proximity to the proximity portion. The second period is shorter than the first period.

Further features of the disclosure will become apparent from the following description of exemplary embodiments with reference to the attached drawings.

DESCRIPTION OF THE EMBODIMENTS

First Embodiment

A first embodiment according to the disclosure is now described. In the following example, the disclosure is applied to an electronic monocular, but the disclosure is applicable to other electronic devices. For example, the disclosure is applicable to other electronic telescopes, such as electronic binoculars, and cameras. The disclosure is applicable to any electronic device that can control the display on a display unit that is visible through a proximity portion.

Figure 1:
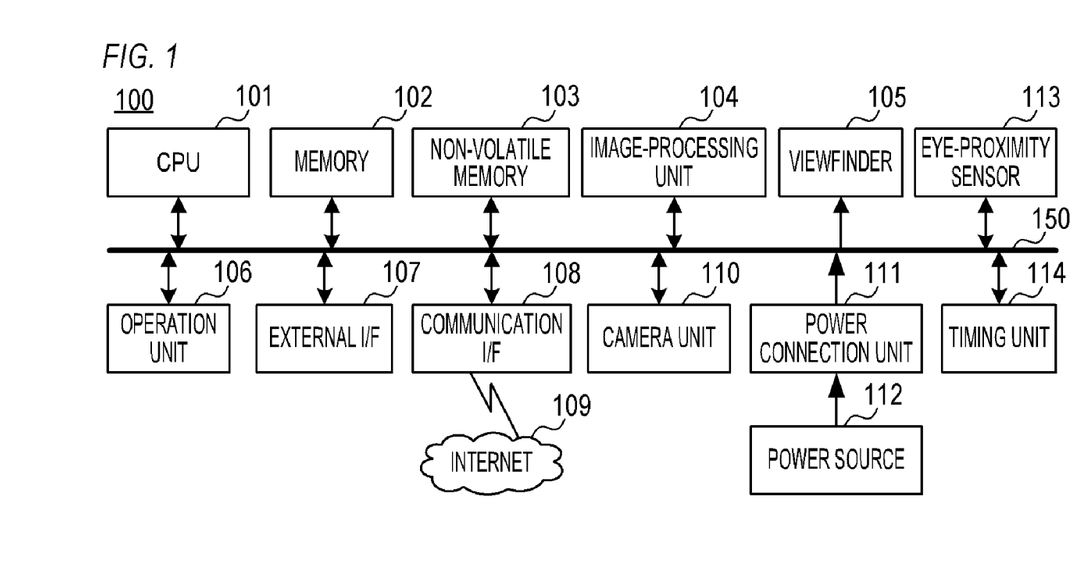
FIG. 1 is a block diagram showing a configuration example of an electronic telescope according to a first embodiment.

FIG. 1 is a block diagram showing a configuration example of an electronic telescope 100 (electronic monocular) according to the first embodiment. The electronic telescope 100 includes a central processing unit (CPU) 101, a memory 102, a non-volatile memory 103, an image-processing unit 104, a viewfinder 105, an operation unit 106, an external interface (I/F) 107, and a communication I/F 108, which are all connected to an internal bus 150. The electronic telescope 100 further includes a camera unit 110, a power connection unit 111, an eye-proximity sensor 113, and a timing unit 114, which are also connected to the internal bus 150. These units connected to the internal bus 150 are configured to be able to exchange data with each other via the internal bus 150.

The CPU 101 controls the units of the electronic telescope 100. For example, the CPU 101 controls each unit of the electronic telescope 100 using the memory 102 as a work memory and according to a program stored in the non-volatile memory 103. The memory 102 may be a random access memory (RAM) (e.g., a volatile memory of a semiconductor element). The non-volatile memory 103 may be a hard disk (HD), a read-only memory (ROM), or a flash memory. The non-volatile memory 103 stores data, such as image data and audio data, and various programs for operating the CPU 101. The CPU 101 executes a program stored in the RAM to function as various units, such as a control unit, described in the following.

Based on the control by the CPU 101, the image-processing unit 104 performs various types of image processing on data such as image data stored in the non-volatile memory 103, image signals obtained via the external I/F 107, and image data obtained via the communication I/F 108. Examples of the image processing performed by the image-processing unit 104 include analog-to-digital (A/D) conversion, digital-to-analog (D/A) conversion, coding, compression, decoding, enlargement and reduction (resizing), noise reduction, and color conversion. The image-processing unit 104 may be configured by a dedicated circuit block for performing specific image processing. Depending on the type of image processing, the CPU 101 can perform image processing according to a program without involving the image-processing unit 104.

The viewfinder 105 (electronic viewfinder) is a display unit that displays images and screens such as a graphical user interface (GUI) screen that constitutes a GUI, based on control by the CPU 101. The CPU 101 generates display control signals according to a program and controls units of the electronic telescope 100 to generate image signals for the display on the viewfinder 105 and output the signals to the viewfinder 105. The viewfinder 105 displays images based on the output image signals. The user positions an eye at the eyepiece 201, which will be described below, to visibly perceive (look into) the viewfinder 105. In other words, the viewfinder 105 is visible through the eyepiece 201.

The operation unit 106 is an input device (operation member) for receiving a user operation, and includes a button, a dial, a joystick, and the like. When an operation is performed on the operation unit 106, the operation unit 106 outputs an operation signal corresponding to the performed operation. The CPU 101 detects an operation on the operation unit 106 by monitoring operation signals (operation detection).

Although not shown in FIG. 1, the operation unit 106 of the first embodiment includes a power button 106a for powering on and off the electronic telescope 100, a menu button 106b, a zoom button 106c, a shutter button 106d, and a moving-image button 106e. These buttons allow the user to switch various setting values of the electronic telescope 100.

The menu button 106b is a button for displaying the menu screen on the viewfinder 105. The menu screen may be used to change the set time (time set value) of the viewfinder off timer and the set time (time set value) of the auto power-off timer. The viewfinder off timer and auto power-off timer will be described below.

The zoom button 106c functions as a button for changing the zoom magnification of the object image (the image of the object captured by the camera unit 110; the live view image) displayed on the viewfinder 105 in an image-capturing standby state. For example, each time the zoom button 106c is pressed, the focal length (corresponding to the zoom magnification) in 35 mm full-frame format is toggled between 100 mm, 400 mm, 800 mm, and 100 mm in this order. The zoom button 106c functions as a SET button used to confirm the item selected on the menu screen, for example.

The shutter button 106d is used to issue an instruction for image-capturing preparation or image capturing. Pressing the shutter button 106d halfway in the image-capturing standby state issues an instruction for image-capturing preparation, thereby starting image-capturing preparation, such as AF (autofocus). Pressing the shutter button 106d fully in the image-capturing standby state issues an instruction for image capturing, thereby performing a series of image-capturing steps from the capturing by the camera unit 110 to the recording of the obtained image. The shutter button 106d functions as a LEFT button used to move the cursor for selecting an item to the left by one item on the menu screen, for example. When a plurality of items is arranged vertically, the cursor moves up by one item when the shutter button 106d is pressed.

The moving-image button 106e functions as a button for instructing the start and stop of moving-image capturing (moving-image recording) in the image-capturing standby state. The moving-image button 106e functions as a RIGHT button used to move the cursor by one item to the right on the menu screen, for example. When a plurality of items is arranged vertically, the cursor moves down by one item when the moving-image button 106e is pressed.

The set time of the viewfinder off timer and the set time of the auto power-off timer may be fixed values. In the first embodiment, the set time of the viewfinder off timer and the set time of the auto power-off timer are set in advance such that the auto power-off timer expires in a shorter time than the viewfinder off timer. The set time of a timer is the period in which the timer expires (expiration time). For example, the set time of the viewfinder off timer may be 3 minutes, and the set time of the auto power-off timer may be shorter than 3 minutes (10 seconds, 30 seconds, 1 minute, etc.). The set times of the viewfinder off timer and the auto power-off timer may be set freely. The set time of the auto power-off timer may be 3 minutes, and the set time of the viewfinder off timer may be longer than 3 minutes.

The external I/F 107 is an interface connected to an external device by wire or wirelessly to input and output image signals and audio signals. The communication OF 108 is an interface that communicates with an external device, the Internet 109, and the like to send and receive various data such as files and commands.

The camera unit 110 includes a lens group, which includes lenses such as a zoom lens and a focus lens, and an imaging element, which may consist of a charge-coupled device (CCD) or complementary metal oxide semiconductor (CMOS) element for converting an optical image into an electric signal. The camera unit 110 can capture an image of an object and generate image data.

The power connection unit 111 receives electric power from the power source 112 and supplies necessary electric power to each unit via the internal bus 150. The power source 112 is the source of electronic power required for the operation of the electronic telescope 100, and may be a secondary battery (e.g., lithium-ion battery), an alternating current (AC) adapter, or the like.

The eye-proximity sensor 113 is arranged near the viewfinder 105 and is capable of determining proximity (the presence of eye in proximity) and out-of-proximity (the absence of eye in proximity) of an eye (object) relative to the eyepiece 201 (proximity portion) (eye-proximity detection). Based on this determination result, the CPU 101 is capable of controlling the presence and absence of image output to the viewfinder 105 (switch-on and switch-off of the viewfinder 105; turning on and off of the display on the viewfinder 105). In the first embodiment, the CPU 101 controls so as not to turn on the display on the viewfinder 105 while the eye is not detected in proximity to the eyepiece 201, and to turn on the display on the viewfinder 105 while the eye is detected in proximity to the eyepiece 201. Alternatively, the CPU 101 may control to turn on the display on the viewfinder 105 regardless of whether the eye is detected in proximity to the eyepiece 201.

The eye-proximity sensor 113, which may be an infrared proximity sensor, can detect an object approaching into proximity to the eyepiece 201 of the viewfinder 105. When an object is in proximity, infrared rays projected from the light-projecting portion (not shown) of the eye-proximity sensor 113 are reflected and received by the light-receiving portion (not shown) of the infrared proximity sensor. The distance of the object from the eyepiece 201 (eye-proximity distance) can also be determined based on the amount of infrared light received. The eye-proximity sensor 113 thus performs eye-proximity detection (proximity detection), in which the distance of an object in proximity to the eyepiece 201 is detected. In an eye out-of-proximity state (non-proximity state), the presence of eye in proximity is detected when an object is detected within a predetermined distance to the eyepiece 201. In an eye-proximity state (proximity state), the absence of eye in proximity is detected when the object that has been detected in proximity moves away by at least the predetermined distance. The threshold for detecting the presence of eye in proximity and the threshold for detecting the absence of eye in proximity may differ from each other by applying hysteresis. After the eye is detected in proximity, the electronic telescope 100 is assumed to be in the eye-proximity state until the absence of eye in proximity is detected. After the absence of eye in proximity is detected, the electronic telescope 100 is assumed to be in the eye out-of-proximity state until the eye is detected in proximity. The infrared proximity sensor is an example, and the eye-proximity sensor 113 may be other sensors capable of detecting proximity or contact of an eye or an object that can be regarded as the presence of eye in proximity.

The timing unit 114 measures the time used for various controls and the time of the built-in clock. For example, the timing unit 114 controls the timing of the viewfinder off timer and the auto power-off timer. As will be described in detail below, the timing unit 114 performs the timing control of the viewfinder off timer such that the viewfinder off timer counts (measures the passage of) the time during which an operation on the operation unit 106 is absent. Also, the timing unit 114 performs the timing control of the auto power-off timer such that the auto power-off timer counts the time during which an operation on the operation unit 106 and eye-proximity to the eyepiece 201 are absent.

Figure 2A:
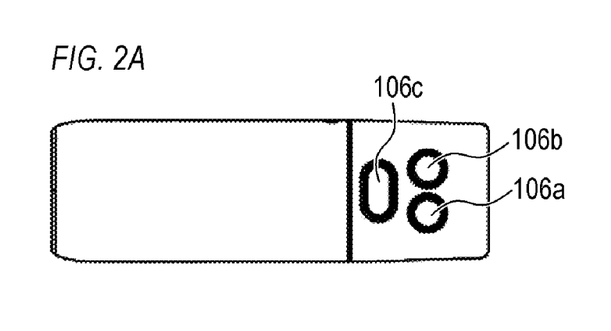
FIGS. 2A to 2D are diagrams of an external appearance of the electronic telescope according to the first embodiment.
Figure 2B:
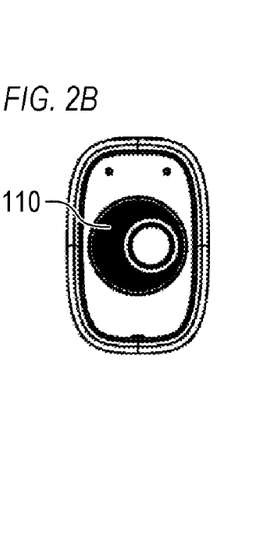
Figure 2C:
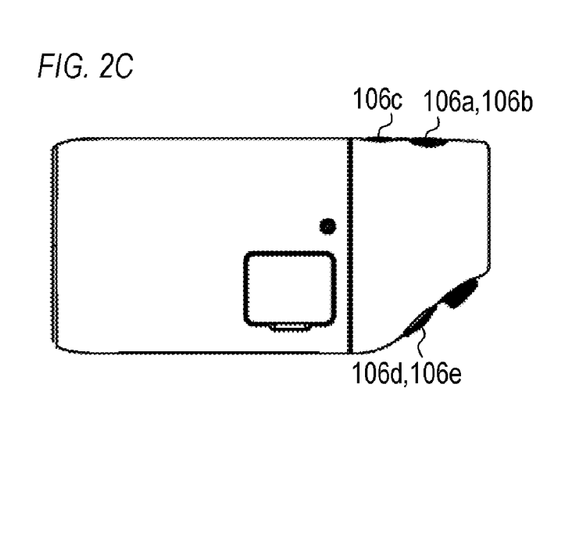
Figure 2D:
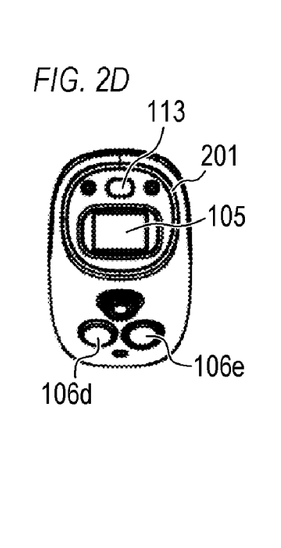

FIGS. 2A to 2D are diagrams of an example of the external appearance of the electronic telescope 100. FIG. 2A is a top view, FIG. 2B is a front view, FIG. 2C is a right side view, and the FIG. 2D is a back view of the electronic telescope 100. FIGS. 2A, 2C, and 2D show the power button 106a, the menu button 106b, the zoom button 106c, the shutter button 106d, and the moving-image button 106e. FIG. 2D shows the eyepiece 201.

Figure 3:
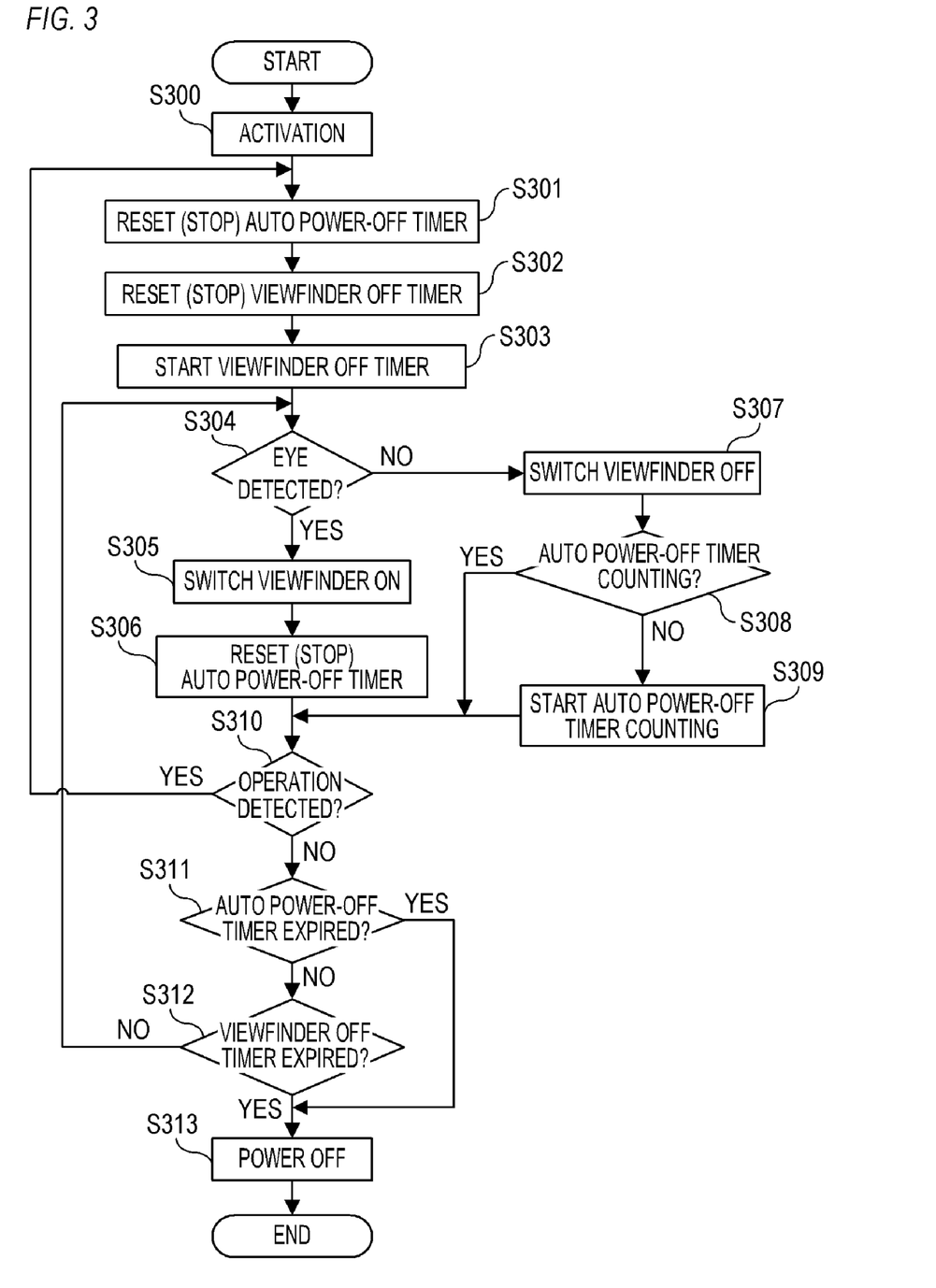
FIG. 3 is a flowchart illustrating an example of a process flow of the electronic telescope according to the first embodiment.

FIG. 3 is a flowchart showing an example of the process flow of the electronic telescope 100. This process flow is performed when the CPU 101 loads a program recorded in the non-volatile memory 103 into the memory 102 and executes the program. When the user operates the power button 106a in the operation unit 106 while the power of the electronic telescope 100 is off, the CPU 101 detects this operation and starts the process flow of FIG. 3.

At S300, the CPU 101 activates the electronic telescope 100 (units of the electronic telescope 100 including the eye-proximity sensor 113 for detecting proximity of the user's eye to the eyepiece 201 and the timing unit 114 for timing control).

At S301, the CPU 101 controls the timing unit 114 to reset the auto power-off timer (reset the counting of the auto power-off timer). This sets the counted time of the auto power-off timer to 0 seconds. When the counting of the auto power-off timer is in progress, resetting the auto power-off timer stops the counting of the auto power-off timer.

At S302, the CPU 101 controls the timing unit 114 to reset the viewfinder off timer (reset the counting of the viewfinder off timer). This sets the counted time of the viewfinder off timer to 0 seconds. When the counting of the viewfinder off timer is in progress, resetting the viewfinder off timer stops the counting of the viewfinder off timer.

At S303, the CPU 101 outputs a request to the timing unit 114 to start the counting of the viewfinder off timer. In response to this request, the timing unit 114 starts the counting of the viewfinder off timer.

At S304, the CPU 101 determines whether the eye-proximity sensor 113 has detected proximity of the eye to the eyepiece 201 (viewfinder 105). If the eye is detected in proximity, the process proceeds to S305. If not, the process proceeds to S307.

At S305, the CPU 101 controls units of the electronic telescope 100 to display the image of an object or the like obtained by the camera unit 110 on the viewfinder 105 (switch on the viewfinder 105). At S306, the CPU 101 resets the auto power-off timer in the same manner as at S301. While the user's eye is in proximity to the eyepiece 201 (YES at S304), the auto power-off timer is stopped. As a result, the electronic telescope 100 is not automatically powered off while the user's eye is in proximity, that is, while it is assumed that the user is looking at the live view image displayed on the viewfinder 105. Thus, the electronic telescope 100 is not suddenly powered off while the user is looking at the live view image, preventing confusion for the user.

At S307, to reduce the power consumption of the electronic telescope 100, the CPU 101 switches off (turns off the display on) the viewfinder 105. At S308, the CPU 101 determines whether the timing unit 114 is performing counting with the auto power-off timer. If the auto power-off timer is counting down, the process proceeds to S310. If not, the process proceeds to S309. At S309, the CPU 101 outputs a request to the timing unit 114 to start the counting of the auto power-off timer. In response to this request, the timing unit 114 starts the counting of the auto power-off timer. That is, the counting of the auto power-off timer starts at the time point (timing) when the eye is no longer detected in proximity to the eyepiece 201.

At S310, the CPU 101 determines whether an operation on the operation unit 106 has been detected. If an operation has been detected, the process proceeds to S301. If not, the process proceeds to S311. Thus, when the operation unit 106 is operated, the counting of the auto power-off timer and the counting of the viewfinder off timer are reset (S301 and S302). Then, at the time point (timing) when the operation unit 106 is operated, the counting of the viewfinder off timer starts (S303).

At S311, the CPU 101 determines whether the auto power-off timer has expired. If the auto power-off timer has expired, the process proceeds to S313. If not, the process proceeds to S312.

At S312, the CPU 101 determines whether the viewfinder off timer has expired. If the viewfinder off timer has expired, the process proceeds to S313. If not, the process proceeds to S304.

At S313, to reduce the power consumption of the electronic telescope 100, the CPU 101 places the electronic telescope 100 in a predetermined power-saving state. Specifically, the CPU 101 performs the end process for each unit of the electronic telescope 100, and powers off the electronic telescope 100. The power-saving state is not limited to a power-off state, and may be any state that consumes less power than the normal state.

FIG. 4A to 4D are time charts showing an example of the power-saving operation of the electronic telescope 100. To simplify the description, it is assumed that the initial state is a state in which the eye is detected in proximity to the eyepiece 201 (viewfinder 105). In FIGS. 4A to 4D, a period t1 is the expiration time of the viewfinder off timer, and a period t2 is the expiration time of the auto power-off timer. The time point 401 is the time when an operation on the operation unit 106 is detected, and the time point 402 is the time when the electronic telescope 100 is powered off. The time point 403 is the time when the absence of eye in proximity to the eyepiece 201 (viewfinder 105) is detected (the time when the eye is no longer detected in proximity to the eyepiece 201), and the time point 404 is the time when the eye is detected in proximity to the eyepiece 201.

Figure 4A:
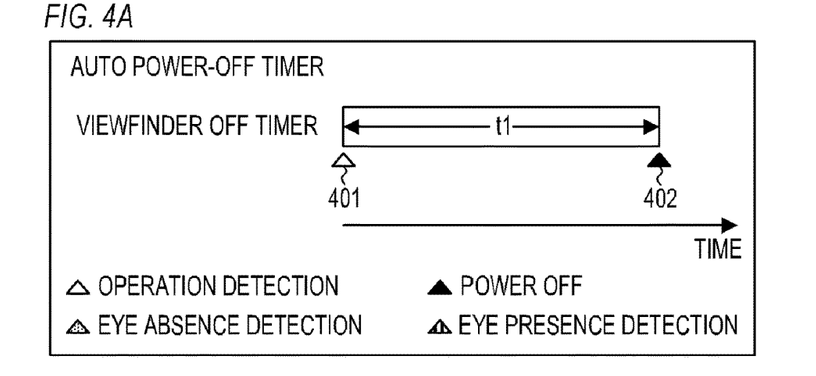
FIGS. 4A to 4D are time charts showing an example of power-saving operation of the electronic telescope according to the first embodiment.

FIG. 4A shows a case in which the viewfinder off timer expires while the eye is detected in proximity. After an operation is detected at the time point 401, the electronic telescope 100 is powered off at the time point 402 when the period t1 elapses without any operation and with the eye in proximity.

Figure 4B:
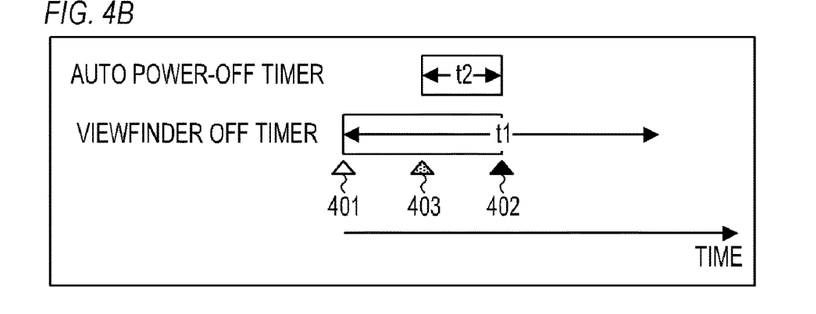

FIG. 4B shows a case in which the counting of the auto power-off timer starts in response to the detection of the absence of eye in proximity, and then the auto power-off timer expires. After the absence of eye in proximity is detected at the time point 403, the electronic telescope 100 is powered off at the time point 402 when the period t2 elapses without any operation and with the eye out of proximity (the time point when the auto power-off timer expires), before the viewfinder off timer expires. In FIG. 4B, an operation is detected at the time point 401 before the time point 403 at which the absence of eye is detected, and the counting of the viewfinder off timer starts. However, the auto power-off timer expires (the period t2 elapses from the time point 403 at which the absence of eye in proximity is detected) before the viewfinder off timer expires (the period t1 elapses from the time point 401). As such, the electronic telescope 100 is powered off at the time point 402 when the period t2 elapses, without waiting for the elapse of the period t1.

Figure 4C:
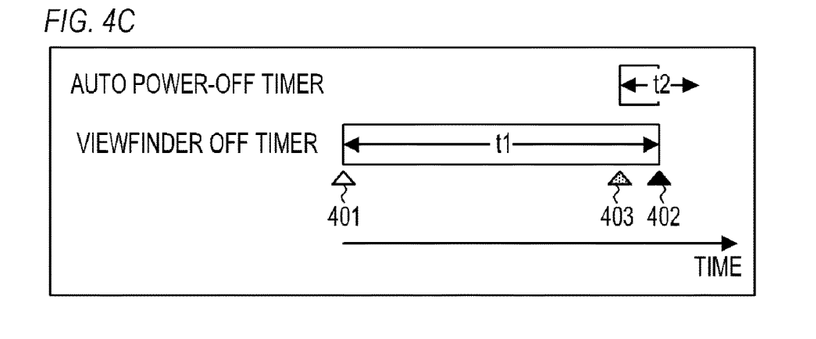

FIG. 4C shows a case in which the viewfinder off timer expires before the auto power-off timer expires. When the absence of eye in proximity is detected at the time point 403, the counting of the auto power-off timer starts. However, the viewfinder off timer expires (the period t1 elapses from the time point 401 at which an operation is detected) before the auto power-off timer expires (the period t2 elapses from the time point 403). As such, the electronic telescope 100 is powered off at the time point 402 when the period t1 has elapsed, without waiting for the elapse of the period t2.

Figure 4D:
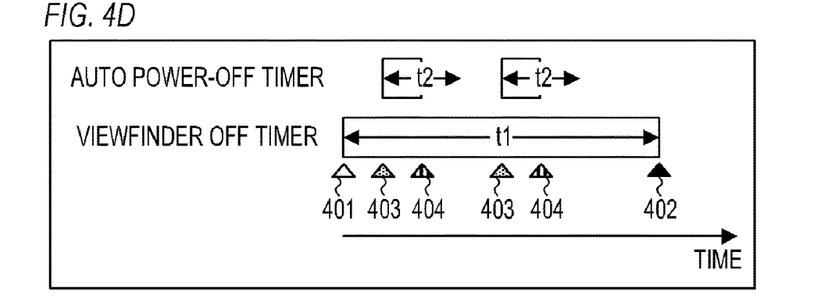

FIG. 4D shows a case where the presence and absence of eye in proximity are repeated in a short time. The auto power-off timer does not expire because the action of moving the eye out of proximity and then back into proximity before the period t2 elapses is repeated. However, as described referring to FIG. 3, the counting of the viewfinder off timer is reset only when the operation unit 106 is operated (YES at S310), and is not reset because of the presence or absence of eye in proximity. The electronic telescope 100 is therefore powered off at the time point 402 when the period t1 elapses from the time point 401 at which an operation is detected (the time point at which the viewfinder off timer expires).

Although not shown in FIGS. 4A to 4D, when the operation unit 106 is operated while the counting for at least one of the periods t1 and t2 is in progress, the counting is reset for both of the periods t1 and t2. As such, in all cases of FIGS. 4A to 4D, when an operation on the operation unit 106 is detected, the electronic telescope 100 returns to the state at the time point 401, and the timing control (timing control of the periods t1 and t2) is performed in accordance with the conditions.

As described above, the first embodiment counts not only the time during which an operation on the operation unit 106 is absent but also the time during which an operation on the operation unit 106 and eye-proximity to the eyepiece 201 are absent. The electronic telescope 100 transitions to the power-saving state when one of the periods reaches the predetermined time. This allows the electronic telescope 100 to transition to the power-saving state with desirable timing. Furthermore, the eye-proximity detection is not disabled until the electronic telescope 100 transitions to the power-saving state, allowing the display on the viewfinder 105 to be turned on/off or maintained depending on the presence or absence of the eye in proximity. This allows the user to quickly check the display on the viewfinder 105 until the electronic telescope 100 transitions to the power-saving state.

Examples of the advantages of the configuration are as follows. When the absence of eye in proximity is detected at the time point 403 in FIGS. 4B to 4D, the viewfinder 105 is switched off, reducing the power consumption of the electronic telescope 100. The eye-proximity sensor 113 always responds while the power of the electronic telescope 100 is on, allowing for the quick display on the viewfinder 105 in response to the eye moving into proximity. Since the electronic telescope 100 only includes the viewfinder 105 as the display unit, the user is unlikely to be using the electronic telescope 100 when the eye is out of proximity. Accordingly, setting the period t2 to a sufficiently short time allows for earlier transition to the power-saving state, further reducing the power consumption of the electronic telescope 100. In addition, as described with reference to FIG. 4D, the presence or absence of eye in proximity does not reset the counting for the period t1. This allows the electronic telescope 100 to transition to the power-saving state in response to the lapse of the period t1, regardless of any reaction of the eye-proximity sensor 113 to the user's abdomen, folded arms, or the like, which may occur against the intention of the user when the electronic telescope 100 is hung from the neck with a neck strap or the like. This avoids wasting of electric power against the intention of the user.

Second Embodiment

A second embodiment according to the disclosure is now described. The description of the same aspects (configuration, process, etc.) as in the first embodiment is omitted as appropriate.

As in the case shown in FIG. 4A, even when an operation is not performed, the user may be using the electronic telescope 100 while the eye is in proximity. If the electronic telescope 100 is powered off without notifying the user, the user who wants to continue using the electronic telescope 100 needs to operate the power button 106*a* to turn on the power again. This may lower the usability of the electronic telescope 100. A similar problem also occurs when the power-saving state is not the power-off state. For this reason, in the second embodiment, the CPU 101 issues a predetermined notification before powering off the electronic telescope 100 after a predetermined period (before placing the electronic telescope 100 in the power-saving state after a predetermined period). The predetermined period is shorter than the expiration time of the auto power-off timer and may be 5 seconds, for example.

Figure 5:
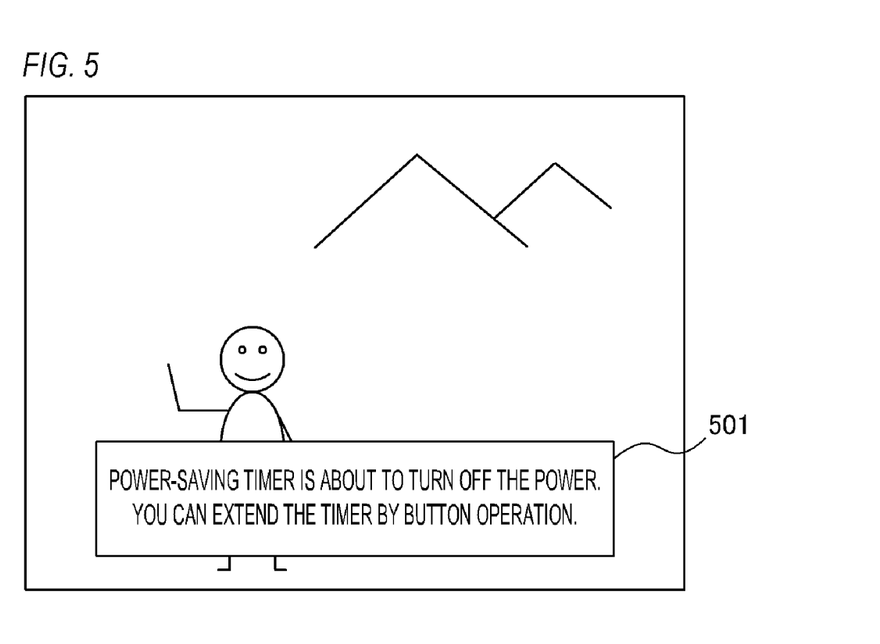
FIG. 5 is a diagram showing a display example of guidance according to a second embodiment.

Specifically, the CPU 101 displays guidance 501 shown in FIG. 5 on the viewfinder 105 before powering off the electronic telescope 100 after the predetermined period. The guidance 501 may indicate that the electronic telescope 100 is about to be powered off by the timer, for example. The guidance 501 may further indicate that the user can operate the operation unit 106 to reset the counting of the timer and extend the time before the electronic telescope 100 is powered off.

Figure 6:
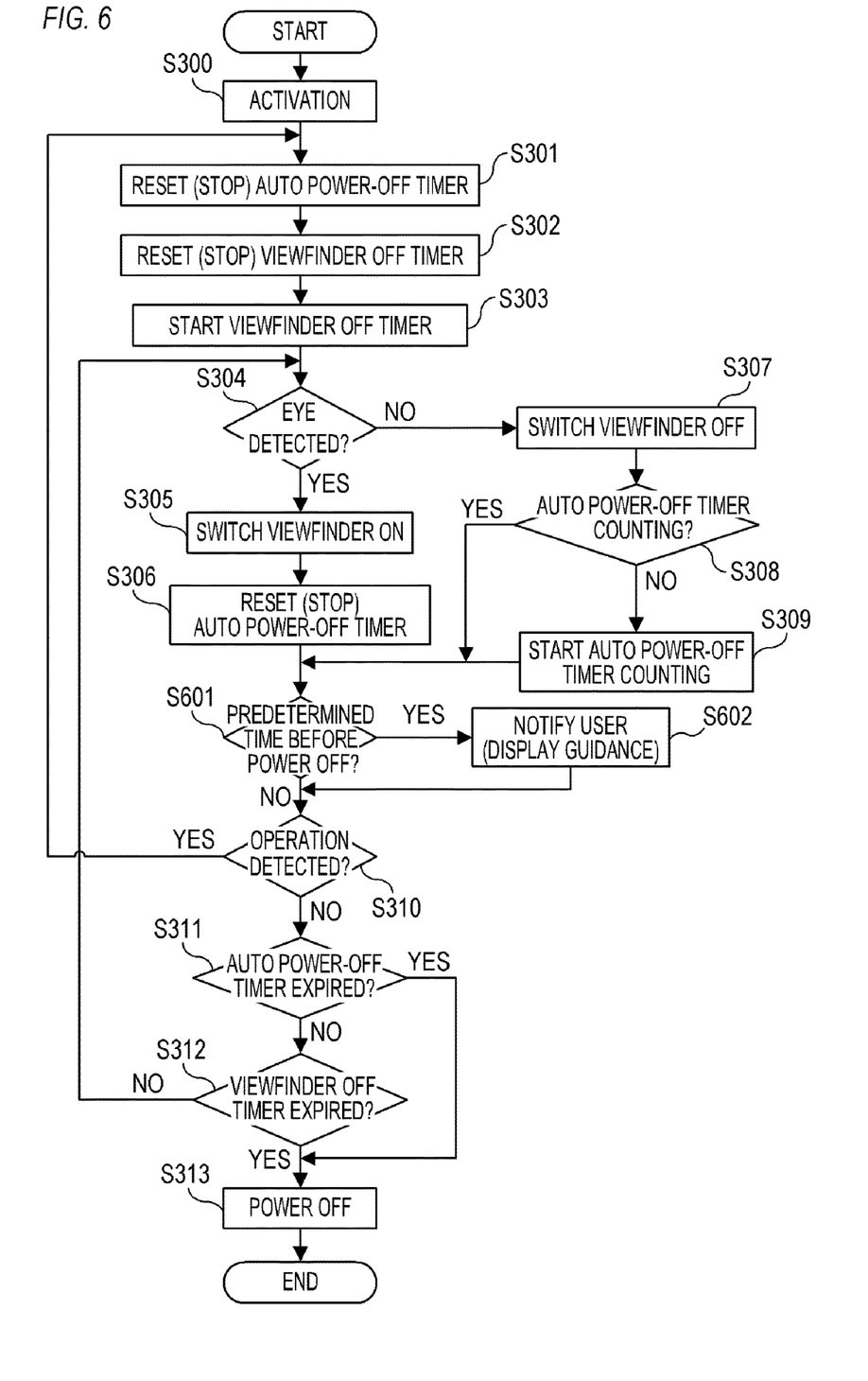
FIG. 6 is a flowchart illustrating an example of a process flow of the electronic telescope according to the second embodiment.

FIG. 6 is a flowchart illustrating an example of a process flow of the electronic telescope 100 of the second embodiment. This process flow is performed when the CPU 101 loads a program recorded in the non-volatile memory 103 into the memory 102 and executes the program. When the user operates the power button 106*a* in the operation unit 106 while the power of the electronic telescope 100 is off, the CPU 101 detects this operation and starts the process flow of FIG. 6. In FIG. 6, the same steps as in FIG. 3 (first embodiment) are designated by the same reference numerals as in FIG. 3.

At S601, the CPU 101 checks the counted time of the auto power-off timer and the counted time of the viewfinder off timer, and determines whether the current time is the predetermined time before powering off the electronic telescope 100. If the current time is the predetermined time before powering off, the process proceeds to S602. If not (if the current time is before the predetermined time before powering off), the process proceeds to S601. The current time is determined as being the predetermined time before powering off when at least one of the following two differences in time is equal to the predetermined period. The current time is determined as not being the predetermined time before powering off when both of the following differences in time are longer than the predetermined period.

The difference in time obtained by subtracting the counted time of the auto power-off timer from the expiration time of the auto power-off timer.

The difference in time obtained by subtracting the counted time of the viewfinder off timer from the expiration time of the viewfinder off timer.

At S602, the CPU 101 displays the guidance 501 on the viewfinder 105. When the user operates the operation unit 106 in response to the display of the guidance 501 (predetermined notification), the process proceeds from S310 to S301. Thus, the auto power-off timer is reset (S301), and the viewfinder off timer is reset (S302), thereby extending the time before the electronic telescope 100 is powered off.

As described above, according to the second embodiment, a predetermined notification is issued before powering off the electronic telescope 100 after the predetermined period. This allows the user to recognize that the electronic telescope 100 is about to be powered off. As a result, the user who wants to continue using the electronic telescope 100 can advantageously operate the operation unit 106 to extend the time before the electronic telescope 100 is powered off. This improves the usability of the electronic telescope 100. The same advantage is also achieved when the power-saving state is not the power-off state.

When the eye is out of proximity, the user is unlikely to be looking at the viewfinder 105. As such, the CPU 101 may be configured so as not to issue the predetermined notification while the eye is not detected in proximity to the eyepiece 201. The CPU 101 may issue the predetermined notification before placing the electronic telescope 100 in the power-saving state after the predetermined period, only while the eye is detected in proximity to the eyepiece 201. That is, S602 may be performed only while the eye is in proximity.

Third Embodiment

A third embodiment according to the disclosure is now described. The description of the same aspects (configuration, process, etc.) as in the first and second embodiments is omitted as appropriate. The second embodiment is an example in which a predetermined notification is issued through the display on the viewfinder 105. The third embodiment issues a predetermined notification by another method.

For example, the electronic telescope 100 may have an audio sounding unit, which may be a speaker (not shown), and the CPU 101 may issue a predetermined notification by audio output from the audio sounding unit (audio output from the electronic telescope 100). Furthermore, the electronic telescope 100 may include a vibrating unit (not shown), and the CPU 101 may issue a predetermined notification by vibrating the vibrating unit (vibration of the electronic telescope 100).

Alternatively, the CPU 101 may issue a predetermined notification through an external device connected to the electronic telescope 100. For example, the CPU 101 notifies the user through an external device by transmitting data to the external device connected via the external I/F 107 or the communication I/F 108. Examples of the external device include earphones, headphones, headsets, and mobile terminal (smartphone, tablet, etc.). The external device may be connected to the electronic telescope 100 by wire or wirelessly. When the external device is connected to the electronic telescope 100 by wire, data is transmitted to the external device via wired communication. When the external device is wirelessly connected to the electronic telescope 100, data is transmitted to the external device via wireless communication.

Specifically, an external device, such as wireless earphones or wireless headphones, is connected to the electronic telescope 100 using Bluetooth (registered trademark), which is a wireless communication standard. The CPU 101 causes the external device to output audio by transmitting audio data to the connected external device. The predetermined notification may be issued by other methods such as vibration of the external device or the display on the external device.

As described above, according to the third embodiment, a predetermined notification is issued before placing the electronic telescope 100 in a power-saving state after the predetermined period as in the second embodiment. The same advantages as in the second embodiment are thus achieved.

Fourth Embodiment

A fourth embodiment according to the disclosure is now described. The description of the same aspects (configuration, process, etc.) as in the first to third embodiments is omitted as appropriate. In some situations, it may be desirable not to automatically power off the electronic telescope 100 in response to expiration of the auto power-off timer or the viewfinder off timer. For this reason, the fourth embodiment does not automatically power off the electronic telescope 100 in such situations.

For example, when connecting the electronic telescope 100 to an external device, the user may operate the electronic telescope 100 (operation unit 106) to place the electronic telescope 100 in a connection-standby state and then operate the external device to connect the external device to the electronic telescope 100. As described above, the external device may be connected to the electronic telescope 100 via the external I/F 107 or the communication I/F 108. Alternatively, the external device may be connected to the electronic telescope 100 by wire or wirelessly. Nevertheless, the procedure described above is often performed when an external device is wirelessly connected to the electronic telescope 100.

In this procedure, while the user is operating the external device, the user's eye is likely to be out of proximity to the viewfinder 105 of the electronic telescope 100. Upon detection of the absence of eye in proximity, the counting of the auto power-off timer starts. As such, the auto power-off timer may expire while the user is operating the external device to connect the external device to the electronic telescope 100, thereby powering off the electronic telescope 100 and causing the external device to be unable to connect to the electronic telescope 100. A similar problem occurs even when the power-saving state is not the power-off state. In addition, the electronic telescope 100 may be powered off because of the auto power-off or viewfinder off timer expiring during moving-image capturing. This interrupts the capturing of a moving image against the user's intention, causing the user to miss an opportunity of image-capturing or suffer other inconvenience. For this reason, in the fourth embodiment, the CPU 101 does not automatically power off the electronic telescope 100 (does not automatically place the electronic telescope 100 in a power-saving state) in at least one of the following cases. The electronic telescope 100 may also be configured so that the counting itself with the auto power-off timer and the viewfinder off timer does not start once the capturing of a moving image starts (that is, the timers are reset when the capturing of a moving image starts).

When the viewfinder 105 performs predetermined display (such as menu screen display or display of a screen relating to the connection to an external device).
During standby for connection to an external device.
During connection to an external device.
During capturing of a moving image.

Figure 7:
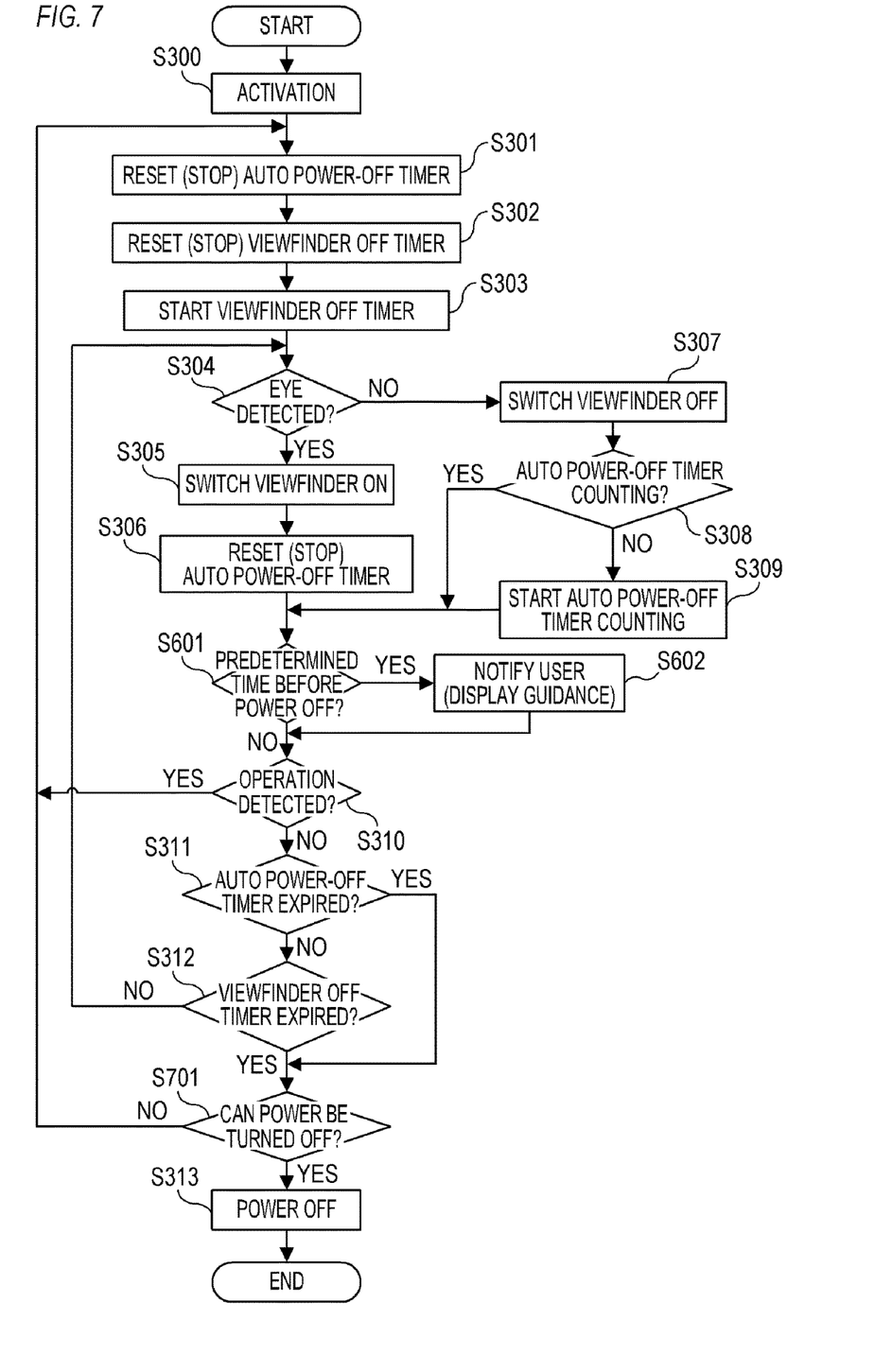
FIG. 7 is a flowchart illustrating an example of a process flow of the electronic telescope according to a fourth embodiment.

FIG. 7 is a flowchart illustrating an example of a process flow of the electronic telescope 100 according to the fourth embodiment. This process flow is performed when the CPU 101 loads a program recorded in the non-volatile memory 103 into the memory 102 and executes the program. When the user operates the power button 106a of the operation unit 106 while the power of the electronic telescope 100 is off, the CPU 101 detects this operation and starts the process flow of FIG. 7. In FIG. 7, the same steps as in FIG. 3 (first embodiment) are designated by the same reference numerals as in FIG. 3, and the same steps as in FIG. 6 (second embodiment) are designated by the same reference numerals as in FIG. 6.

At S701, the CPU 101 determines whether the electronic telescope 100 is in a state in which the power can be turned off. The state in which the power can be turned off is a state other than the states in which the electronic telescope 100 should not be automatically powered off, which are described above. In other words, the above-mentioned states in which the electronic telescope 100 should not be automatically powered off are states in which the power cannot be turned off. If the electronic telescope 100 is in a state in which the power can be turned off, the process proceeds to S313, and the electronic telescope 100 is placed in the power-off state. If not (when the electronic telescope 100 is in a state in which the power cannot be turned off), the process proceeds to S301 so that the power of the electronic telescope 100 is not automatically turned off.

As described above, according to the fourth embodiment, under specific conditions (in specific cases), the electronic telescope 100 is not automatically placed in a power-saving state. As a result, the electronic telescope 100 transitions to a power-saving state with more desirable timing.

Fifth Embodiment

A fifth embodiment according to the disclosure is now described. The description of the same aspects (configuration, process, etc.) as in the first to fourth embodiments is omitted as appropriate. As described in the first embodiment, at least one of the expiration time of the viewfinder off timer and the expiration time of the auto power-off timer may be changeable by the user. The fifth embodiment is a specific example in which the expiration time of the viewfinder off timer and the expiration time of the auto power-off timer are changed in response to a user operation.

Figure 8A:
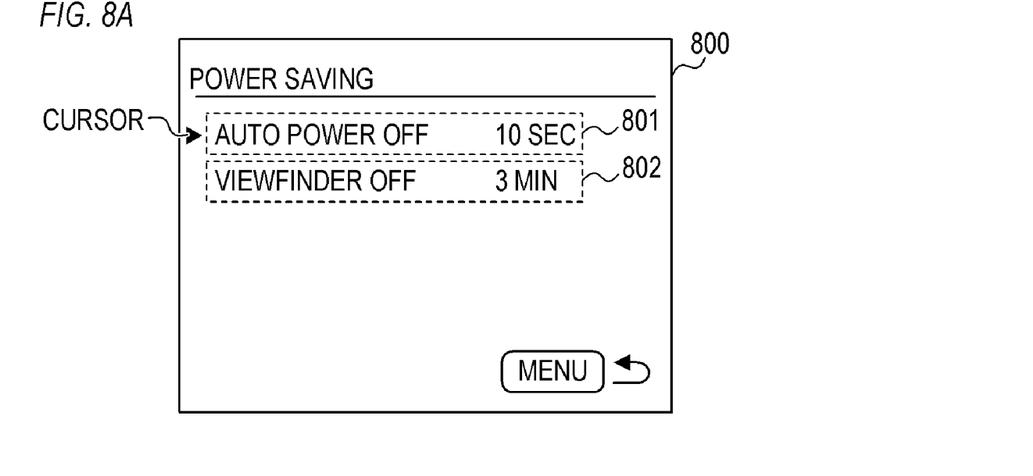
FIGS. 8A to 8C are diagrams showing display examples of the screens according to a fifth embodiment.

When the menu button 106b in the operation unit 106 is pressed, the CPU 101 displays the menu screen 800 of FIG. 8A on the viewfinder 105. The menu screen 800 includes an item 801 indicating the current expiration time of the auto power-off timer and an item 802 indicating the current expiration time of the viewfinder off timer. The user can select the item 801 or the item 802 with the cursor by operating the operation unit 106 (the shutter button 106d (LEFT button) or the moving-image button 106e (RIGHT button)). Then, the user can confirm the selected item with the zoom button 106c (SET button). Specifically, the user selects and confirms the item 801 to change the expiration time of the auto power-off timer, and selects and confirms the item 802 to change the expiration time of the viewfinder off timer. When the menu button 106b is pressed again, the image-capturing standby state is restored, and the display on the viewfinder 105 returns to the display of the object image.

Figure 8B:
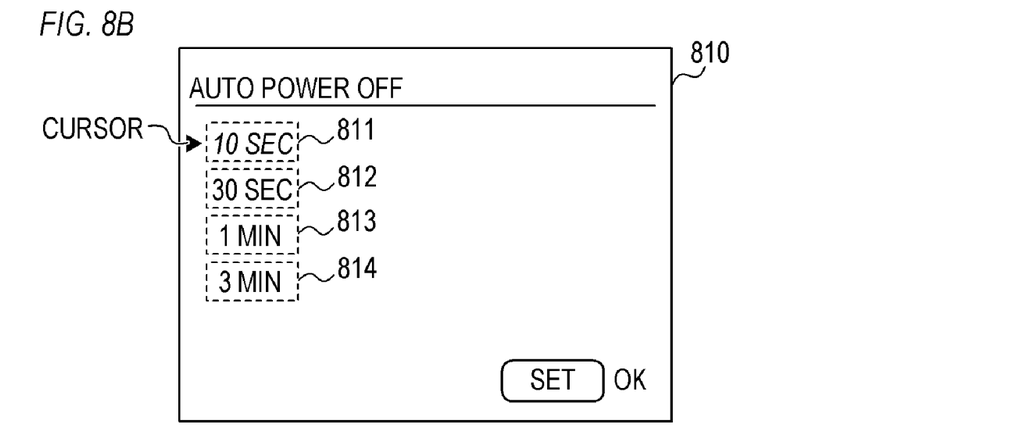

When the item 801 of the menu screen 800 shown in FIG. 8A is confirmed, the CPU 101 shifts the screen displayed on the viewfinder 105 from the menu screen 800 of FIG. 8A to the setting screen 810 of FIG. 8B. The setting screen 810 displays four options 811 to 814 for the expiration time of the auto power-off timer. In FIG. 8B, the options 811 to 814 are displayed such that the option corresponding to the current setting of the auto power-off timer is in italics to be distinguishable (other methods may be used for distinguishing). The user can select any of the options 811 to 814 with the cursor by operating the operation unit 106 (the shutter button 106d (LEFT button) or the moving-image button 106e (RIGHT button)). Then, the user can confirm the selected option with the zoom button 106c (SET button).

When the option 811 is confirmed, the CPU 101 sets the expiration time of the auto power-off timer to 10 seconds. When the option 812 is confirmed, the CPU 101 sets the expiration time of the auto power-off timer to 30 seconds. Likewise, when the option 813 is confirmed, the CPU 101 sets the expiration time of the auto power-off timer to 1 minute. When the option 814 is confirmed, the CPU 101 sets the expiration time of the auto power-off timer to 3 minutes.

The number of options and times on the auto power-off timer setting screen may be set freely. Of a plurality of options on the auto power-off timer setting screen, the options that are greater than or equal to the current expiration time of the viewfinder off timer may be grayed out or hidden to prohibit selection. For example, when the current expiration time of the viewfinder off timer is 3 minutes, the option 814 may be grayed out or hidden to prohibit selection. Instead of displaying options, the setting screen of the auto power-off timer may allow the user to input an arbitrarily selected time. In that case, the time entered by the user is set as the expiration time of the auto power-off timer. On the setting screen of the auto power-off timer, the user may be able to input time without an upper limit, or may input time that does not exceed the expiration time of the viewfinder off timer.

Figure 8C:
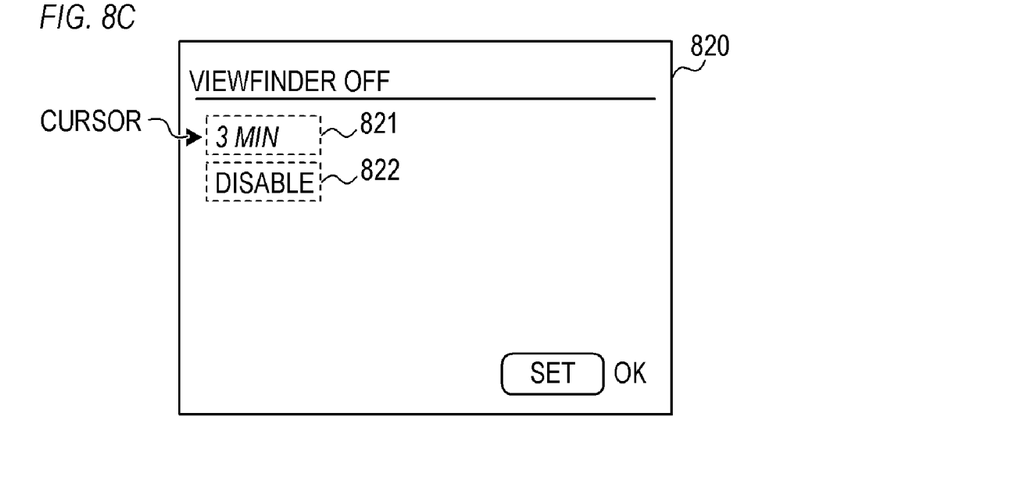

When the item 802 of the menu screen 800 shown in FIG. 8A is confirmed, the CPU 101 shifts the screen displayed on the viewfinder 105 from the menu screen 800 of FIG. 8A to the setting screen 820 of FIG. 8C. The setting screen 820 displays two options 821 and 822 for the setting of the viewfinder off timer. In FIG. 8C, the options 821 and 822 are displayed such that the option corresponding to the current setting of the viewfinder off timer is distinguishable. The user can select the option 821 or the option 822 with the cursor by operating the operation unit 106 (the shutter button 106d (LEFT button) or the moving-image button 106e (RIGHT button)). Then, the user can confirm the selected option with the zoom button 106c (SET button).

When the option 821 is confirmed, the CPU 101 sets the expiration time of the viewfinder off timer to 3 minutes. When the option 822 is confirmed, the CPU 101 disables the viewfinder off timer. When the viewfinder off timer is disabled, the power-saving operation of the electronic telescope 100 is performed using only the auto power-off timer without using the viewfinder off timer.

As with the setting screen of the auto power-off timer, the viewfinder off timer setting screen may display a plurality of options for the expiration time of the viewfinder off timer. The number of options and times on the viewfinder off timer setting screen may be set freely. Of a plurality of options in the viewfinder off timer setting screen, the options that are less than or equal to the current expiration time of the auto power-off timer may be grayed out or hidden to prohibit selection. Instead of displaying options, the setting screen of the viewfinder off timer may allow the user to input an arbitrarily selected time. In that case, the time entered by the user is set as the expiration time of the viewfinder off timer. On the setting screen of the viewfinder off timer, the user may be able to input time without an upper limit, or may input time that does not exceed a predetermined time.

Furthermore, when the shutter button 106d or the moving-image button 106e is pressed in the image-capturing standby state, the image-capturing preparation process and the image-capturing (moving-image recording) process are performed at any step. When the shutter button 106d or the moving-image button 106e is pressed while the menu screen is displayed, the state transitions to the image-capturing standby state.

As described above, according to the fifth embodiment, the expiration time of the viewfinder off timer and the expiration time of the auto power-off timer are changed in response to a user operation, achieving a power-saving operation that accommodates the user's preference.

Some preferred embodiments (examples) of the disclosure are described above in detail, but the disclosure is not limited to these specific embodiments, and various embodiments within the scope of the disclosure are also included in the disclosure. The foregoing embodiments are merely illustrative embodiments of the disclosure, and the embodiments may be combined as appropriate.

The various controls that are performed by the CPU 101 in the foregoing description may be performed by a single piece of hardware. Alternatively, processes may be shared by a plurality of pieces of hardware (e.g., a plurality of processors and circuits) to control the entire device.

According to the present disclosure, an electronic device is provided that transitions to a power-saving state with desirable timing, and also allows the user to quickly check the display on a display unit (such as an electronic viewfinder) that is visible through a proximity portion until the electronic device transitions to the power-saving state.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-087371, filed on May 19, 2020, which is hereby incorporated by reference herein in its entirety.

What is claimed is:

1. An electronic device comprising:
a proximity detector configured to detect proximity to a proximity portion;
an operation detector configured to detect an operation on an operation member; and
at least one memory and at least one processor which together function as a control unit configured to:
perform displaying on a display that is visible through the proximity portion;
regardless of whether proximity to the proximity portion is detected, place the electronic device in a predetermined state to reduce power consumption of the electronic device in response to elapse of a first period without an operation on the operation member; and
in a case where proximity to the proximity portion is not detected, place the electronic device in the predetermined state to reduce power consumption of the electronic device in response to elapse of a second period without an operation on the operation member and without proximity to the proximity portion, the second period being shorter than the first period,
wherein the control unit issues a predetermined notification before a third period of time, in which the electronic device is in the predetermined state, the third period being shorter than the second period.

2. The electronic device according to claim 1, wherein the control unit controls so that:
in a case where proximity to the proximity portion is not detected, displaying on the display is not performed; and
in a case where proximity to the proximity portion is detected, displaying on the display is performed.

3. The electronic device according to claim 1, wherein the control unit controls so as to:
in a case where proximity to the proximity portion is detected, place the electronic device in the predetermined state upon expiration of a first timer that expires in the first period and that counts time during which an operation on the operation member is absent; and
in a case where proximity to the proximity portion is not detected, place the electronic device in the predetermined state upon expiration of a second timer that expires in the second period and that counts time during which an operation on the operation member and proximity to the proximity portion are absent.

4. The electronic device according to claim 1, wherein the control unit controls so that:
in a case where proximity to the proximity portion is not detected, the predetermined notification is not issued; and
in a case where proximity to the proximity portion is detected, the predetermined notification is issued before the third period of placing the electronic device in the predetermined state.

5. The electronic device according to claim 1, wherein the control unit controls to issue the predetermined notification through displaying on the display.

6. The electronic device according to claim 1, wherein the control unit controls to issue the predetermined notification through vibration of the electronic device, audio output from the electronic device, or an external device.

7. The electronic device according to claim 1, wherein the control unit does not place the electronic device in the predetermined state in a case where the display performs predetermined displaying.

8. The electronic device according to claim 7, wherein the predetermined displaying is menu screen displaying.

9. The electronic device according to claim 7, wherein the predetermined displaying is displaying of a screen relating to connection to an external device.

10. The electronic device according to claim 1, wherein the control unit does not place the electronic device in the predetermined state during standby for connection to an external device.

11. The electronic device according to claim 1, wherein the control unit does not place the electronic device in the predetermined state during connection to an external device.

12. The electronic device according to claim 1, wherein the first period is a period in which counting starts at a time point when an operation is performed on the operation member.

13. The electronic device according to claim 1, wherein the second period is a period in which counting starts at a time point when the proximity to the proximity portion is no longer detected.

14. The electronic device according to claim 1, wherein the control unit further resets counting for the first period and counting for the second period in a case where an operation is performed on the operation member.

15. The electronic device according to claim 1, wherein the control unit further resets counting for the second period in a case where proximity to the proximity portion is detected.

16. The electronic device according to claim 1, wherein the predetermined state is a power-off state.

17. The electronic device according to claim 1, wherein the electronic device is an electronic telescope.

18. A control method of an electronic device, comprising:
  detecting proximity to a proximity portion;
  detecting an operation on an operation member; and
  controlling to:
  perform displaying on a display that is visible through the proximity portion;
  regardless of whether proximity to the proximity portion is detected or not, place the electronic device in a predetermined state to reduce power consumption of the electronic device in response to elapse of a first period without an operation on the operation member;
  in a case where proximity to the proximity portion is not detected, place the electronic device in the predetermined state to reduce power consumption of the electronic device in response to elapse of a second period without an operation on the operation member and without proximity to the proximity portion, the second period being shorter than the first period, and
  issuing a predetermined notification before a third period of time, in which the electronic device is in the predetermined state, the third period being shorter than the second period.

19. A non-transitory computer readable medium that stores a program, wherein the program causes a computer to execute a control method of an electronic device, a control method comprising:
  detecting proximity to a proximity portion;
  detecting an operation on an operation member; and
  controlling to:
  perform displaying on a display that is visible through the proximity portion;
  regardless of whether proximity to the proximity portion is detected, place the electronic device in a predetermined state to reduce power consumption of the electronic device in response to elapse of a first period without an operation on the operation member;
  in a case where proximity to the proximity portion is not detected, place the electronic device in the predetermined state to reduce power consumption of the electronic device in response to elapse of a second period without an operation on the operation member and without proximity to the proximity portion, the second period being shorter than the first period, and
  issuing a predetermined notification before a third period of time, in which the electronic device is in the predetermined state, the third period being shorter than the second period.

* * * * *